United States Patent
Psaila et al.

(10) Patent No.: US 11,841,540 B2
(45) Date of Patent: Dec. 12, 2023

(54) OPTICAL APPARATUS, OPTICAL ASSEMBLY AND METHODS OF MANUFACTURE THEREOF

(71) Applicant: Intel Corporation, Santa Clara, CA (US)

(72) Inventors: Nicholas D. Psaila, Livingston (GB); Graeme Brown, Livingston (GB); John Macdonald, Livingston (GB); Paul Mitchell, Livingston (GB); Mark Hesketh, Livingston (GB); Anthony Traynor, Livingston (GB); Richard Laming, Livingston (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/955,963

(22) PCT Filed: Dec. 21, 2018

(86) PCT No.: PCT/GB2018/053737
§ 371 (c)(1),
(2) Date: Jun. 19, 2020

(87) PCT Pub. No.: WO2019/122914
PCT Pub. Date: Jun. 27, 2019

(65) Prior Publication Data
US 2020/0326491 A1    Oct. 15, 2020

(30) Foreign Application Priority Data

Dec. 22, 2017 (GB) ...................... 1721814

(51) Int. Cl.
*G02B 6/42* (2006.01)
*G02B 6/32* (2006.01)

(52) U.S. Cl.
CPC ............. *G02B 6/4214* (2013.01); *G02B 6/32* (2013.01)

(58) Field of Classification Search
CPC ................................ G02B 6/4214; G02B 6/32
(Continued)

(56) References Cited

U.S. PATENT DOCUMENTS

| 4,772,787 A | * | 9/1988 | Trommer | ........... G02B 6/12002 250/227.29 |
| 4,993,796 A | * | 2/1991 | Kapany | ................ G02B 6/2817 250/227.11 |

(Continued)

FOREIGN PATENT DOCUMENTS

| JP | S61121014 A | 6/1986 |
| JP | H07120630 A | 5/1995 |

(Continued)

OTHER PUBLICATIONS

International Search Report and Written Opinion issued in corresponding International Application No. PCT/GB2018/053737 filed Dec. 21, 2018.

(Continued)

*Primary Examiner* — Kaveh C Kianni
(74) *Attorney, Agent, or Firm* — Alliance IP, LLC

(57) ABSTRACT

An optical apparatus (10) for routing an optical signal (12) comprises a body (14) comprising a material. A waveguide (16) is formed in the body (14) by laser modification of the material. The optical apparatus (10) further comprises a region (18) comprising a lower refractive index than the material of the body (14) and defines an interface (24) between the region (18) and the waveguide (16). The waveguide (16) and the interface (24) are aligned relative to each other for routing the optical signal (12) therebetween and reflecting the optical signal (12) at the interface (24).

22 Claims, 7 Drawing Sheets

(58) Field of Classification Search
USPC .......................................................... 385/33
See application file for complete search history.

(56) References Cited

U.S. PATENT DOCUMENTS

| | | | |
|---|---|---|---|
| 5,335,243 A | 8/1994 | Kubena et al. | |
| 5,488,696 A * | 1/1996 | Brosnan | G02B 6/0036 385/129 |
| 6,259,841 B1 * | 7/2001 | Bhagavatula | G02B 6/12007 385/129 |
| 6,477,296 B1 * | 11/2002 | Ogawa | G02B 6/4246 385/31 |
| 6,563,973 B1 * | 5/2003 | Caracci | G02F 1/1326 349/196 |
| 7,599,277 B1 * | 10/2009 | Kato | G11B 7/124 369/112.09 |
| 7,945,131 B1 | 5/2011 | Asghari | |
| 9,869,818 B2 * | 1/2018 | Tang | G02B 6/4295 |
| 9,891,385 B2 * | 2/2018 | Tang | G02B 6/3825 |
| 10,025,044 B1 * | 7/2018 | Masuda | G02B 6/4214 |
| 10,168,494 B2 * | 1/2019 | Héroux | G02B 6/4214 |
| 10,416,396 B2 * | 9/2019 | Chang | G02B 6/4206 |
| 2002/0097962 A1 * | 7/2002 | Yoshimura | H01L 23/48 385/50 |
| 2003/0035640 A1 * | 2/2003 | Dugan | G02B 6/13 385/124 |
| 2003/0235385 A1 * | 12/2003 | Taylor | G02B 6/136 385/129 |
| 2004/0129935 A1 * | 7/2004 | Blauvelt | H01L 31/107 257/40 |
| 2004/0131302 A1 | 7/2004 | Kouta et al. | |
| 2004/0258359 A1 * | 12/2004 | Corkum | B82Y 20/00 385/39 |
| 2005/0002175 A1 * | 1/2005 | Matsui | G02B 6/0036 362/603 |
| 2006/0062512 A1 * | 3/2006 | Lee | G02B 6/4214 385/15 |
| 2006/0239605 A1 * | 10/2006 | Palen | G02B 6/30 385/14 |
| 2006/0275004 A1 * | 12/2006 | Fujii | G02B 6/138 385/129 |
| 2007/0077008 A1 * | 4/2007 | Jeon | G02B 6/10 385/49 |
| 2007/0092193 A1 * | 4/2007 | Yokino | G02B 6/12007 385/129 |
| 2008/0083699 A1 | 4/2008 | Brooks et al. | |
| 2008/0226221 A1 * | 9/2008 | Bidnyk | G02B 6/42 385/14 |
| 2008/0232753 A1 * | 9/2008 | Fujii | G02B 6/125 385/126 |
| 2009/0214170 A1 | 8/2009 | Wei | |
| 2010/0030043 A1 * | 2/2010 | Kuhn | A61B 5/14542 600/339 |
| 2010/0278480 A1 * | 11/2010 | Vasylyev | G02B 6/0038 385/33 |
| 2012/0155822 A1 * | 6/2012 | Yanagisawa | G02B 6/138 385/130 |
| 2012/0183009 A1 * | 7/2012 | Adachi | H01S 5/18 372/99 |
| 2012/0314990 A1 * | 12/2012 | Pitwon | G02B 6/1221 385/14 |
| 2014/0050490 A1 * | 2/2014 | Giziewicz | G02B 6/4214 398/139 |
| 2014/0072311 A1 * | 3/2014 | Giziewicz | G02B 6/4243 398/135 |
| 2014/0086586 A1 * | 3/2014 | Voutilainen | H04B 10/801 398/115 |
| 2016/0238794 A1 * | 8/2016 | Tang | G02B 6/32 |
| 2016/0238801 A1 * | 8/2016 | Lee | G02B 6/136 |
| 2016/0313492 A1 * | 10/2016 | Ma | G09G 5/10 |
| 2016/0341903 A1 * | 11/2016 | Tang | G02B 6/4246 |
| 2016/0356971 A1 * | 12/2016 | de Jong | G02B 6/4257 |
| 2018/0074271 A1 * | 3/2018 | Song | G02B 6/4214 |
| 2019/0011652 A1 * | 1/2019 | Chang | H05K 1/0274 |
| 2019/0033542 A1 * | 1/2019 | Epitaux | G02B 6/4246 |
| 2019/0235167 A1 * | 8/2019 | Pitwon | G02B 6/125 |
| 2020/0219818 A1 * | 7/2020 | Menard | H01L 23/53223 |

FOREIGN PATENT DOCUMENTS

| | | |
|---|---|---|
| JP | 2003-131053 A | 5/2003 |
| JP | 2005134493 A | 5/2005 |
| JP | 2008-9098 A | 1/2008 |
| WO | 01/01176 A1 | 1/2001 |

OTHER PUBLICATIONS

Desmet, A. et al. Laser printed glass planar lightwave circuits with integrated fiber alignment structures. In Optical Interconnects XVIII, vol. 10538, 2018, SPIE. 11 pages. Retrieved from the Internet <URL: https://doi.org.10.1117/12.2288232.>.

Japanese Office Action received in Application No. 2020-535031, dated Jun. 6, 2023, with Statement of Relevance, 5 pages.

Japan Patent Office Decision for Grant in JP Application Serial No. 2020-535031 dated Oct. 17, 2023.

* cited by examiner

OPTICAL APPARATUS, OPTICAL ASSEMBLY AND METHODS OF MANUFACTURE THEREOF

CROSS-REFERENCE TO RELATED APPLICATIONS

This application is a national phase application filed under 35 U.S.C. § 371 of International Application No. PCT/GB2018/053737, filed Dec. 21, 2018, which claims priority to GB 1721814.0, filed Dec. 22, 2017.

FIELD

This disclosure relates to optical apparatus and methods of manufacture thereof, the optical apparatus being for use in routing or manipulating optical signals for, but not exclusively, optical communications systems, or the like.

BACKGROUND

Photonic components may be provided in optical communication with each other using routing or optical manipulation structures such as waveguides or optical fibers. Photonic components may include transmitting and/or receiving components such as VCSELS, photodiodes, surface grating couplers and the like provided in optical communication with other photonic components using such routing or optical manipulation structures. The routing or optical manipulation structures may support propagation of optical signals between photonic components, for example, as may be used in optical communication systems, or the like.

Some photonic components may transmit or receive an optical signal in an orthogonal direction to the desired optical path direction. Some optical systems may require routing of an optical signal such that the optical signal is turned through a large angle, for example 90 degrees. This routing may be used to launch the optical signal into a waveguide, or in any desired direction. Providing routing for an optical signal in a small footprint (e.g. vertically and/or horizontally) and integrating within a standard optical package may be a challenge.

There are a number of approaches for achieving this within traditional waveguide platforms, such as lithographically defined glass or polymer waveguides. These approaches involve fabricating a micromirror structure for reflecting an optical signal, for example, using semiconductor-style wafer etching, or mechanical blade dicing a bulk material. The micromirror structure may be used to reflect an optical signal e.g. through 90 degrees or in any desired direction.

Known approaches may be restricted in the arrangements of waveguide and mirror geometries that they are able to provide and/or the in efficiency of reflection that is able to be obtained, for instance leading to at least part of a beam falling below a critical angle relative to the mirror thus limiting reflection efficiency. The limitations on the possible arrangements of waveguide and reflectors in a lithographically-formed layered structure may represent a significant constraint, particularly as demand for more complex optical communication or electro-optical circuitry increases.

SUMMARY

There is provided an optical apparatus, an optical assembly, and methods of manufacture thereof. The optical apparatus may be for use in routing or manipulating optical signals for, but not exclusively, optical communications, or the like.

The optical apparatus, optical assembly and methods of manufacture thereof may at least one of: provide a relatively compact apparatus and/or be used in conjunction with relatively compact apparatus; provide straightforward alignment between photonic components (e.g., first and second devices); relatively straightforward and/or cost effective to manufacture; provide flexible design options for routing or manipulating optical signals; allow integration and/or coupling with other photonic components; reduce the number of components required to integrate and/or couple with other photonic components; reduce optical losses; provide space for further optical devices; and the like.

According to an aspect, there is provided an optical apparatus for routing an optical signal. The optical apparatus may comprise a body. The body may comprise a material. The optical apparatus may comprise a waveguide formed in the body by laser modification of the material. The optical apparatus may comprise a region comprising a lower refractive index than the material of the body and may define an interface between the region and the waveguide. The waveguide and the interface may be aligned relative to each other for routing the optical signal therebetween and reflecting the optical signal at the interface.

The waveguide and the interface may be aligned relative to each other such that the optical signal is incident on the interface at an angle greater than a critical angle for supporting total internal reflection.

The interface and an output of the waveguide may be separated such that in operation the optical signal leaves the waveguide output as a beam that diverges to at least some extent before arriving at the interface, and the interface may be shaped and oriented relative to the waveguide such that at least one of:

a) the beam is incident on the interface at an angle greater than the critical angle across substantially the full width of the beam;
b) total internal reflection is obtained at the interface across substantially the full width of the beam.

A centreline of the waveguide may extend through the body in three orthogonal directions and/or the waveguide may follow a curved path through the body.

At least a portion of the waveguide proximate to the interface may be non-parallel to at least one surface of the body.

The body may comprise at least a first surface and a second different surface. The region may extend through the body from the first surface. The interface may be arranged so that the optical signal enters or exits the body through the second surface.

The first surface and the second surface may be opposing surfaces, optionally bottom and top surfaces or vice versa.

The region may comprise a cavity. The cavity may be provided in the body.

The interface may comprise an interface between material of the body, or a layer attached to material of the body, and air or other gas or vacuum in the cavity.

The waveguide may be positioned within the body such that the optical signal does not propagate through the lower refractive index region before being reflected at the interface.

The region may be formed by modifying the material with a laser processing system and subsequently removing the modified material by etching.

The region may be formed by using a bladed article to remove material.

The waveguide and interface may be configured to allow the optical signal to propagate in either or both directions along a beam path defined between a surface of the body and the waveguide.

The interface may be configured to reflect the optical signal between the surface and the waveguide.

The interface may be oriented at an acute angle relative to the surface of the body.

The interface may be shaped for modifying a characteristic of the optical signal. The characteristic may comprise at least one of: divergence, convergence, beam shape, and any other characteristic of the optical signal.

The interface may comprise at least one of: a concave surface; convex surface; non-planar surface; curved surface; axicon; Fresnel lens; aberration compensator; phase pattern or shape; diffractive element; and any other beam shaping device.

The waveguide and the interface may be configured such that a characteristic of the optical signal is modified. The characteristic may comprise at least one of: divergence, convergence, beam shape, and any other characteristic of the optical signal.

The waveguide and interface may be configured such that their relative positioning and alignment modifies the characteristic of the optical signal.

The interface and waveguide may be configured to modify the optical signal so as to form a convergent, collimated or divergent optical signal.

The optical apparatus may comprise at least one region forming a plurality of interfaces for routing the optical signal.

The plurality of interfaces may be configured to change a direction of propagation of the optical signal within the body, optionally wherein the plurality of interfaces may be configured to provide a lateral change in propagation direction of the optical signal.

The waveguide may comprise at least one of: a multimode; and single-mode waveguide.

The optical apparatus may comprise a plurality of waveguides and at least one interface. The plurality of waveguides may support propagation of a plurality of optical signals therethrough.

The optical apparatus may comprise at least one optical component positioned in or on the body for manipulating the optical signal.

The at least one optical component may comprise a beam shaping device, optionally wherein the beam shaping device may comprise a lens.

The at least one optical component may comprise a filter.

The optical apparatus may comprise a coating on a surface of the interface, optionally wherein the coating may comprise a metal coating.

The optical apparatus may comprise at least one of a first device and a second device. The first device may be operative to send and/or receive the optical signal via the interface. For example, the interface may reflect the optical signal to allow the optical signal to propagate through the body between the waveguide and the first device. The second device may be coupled to the waveguide for sending and/or receiving the optical signal via the waveguide. Thus, the interface may act to guide the optical signal between the first device and the second device.

The optical apparatus may comprise at least one photonic component coupled to the body for at least one of: transmitting the optical signal into; and receiving the optical signal from the body, and optionally wherein the at least one photonic component may comprise at least one of: a detector; laser; semiconductor device.

According to an aspect, there is provided an optical assembly. The optical assembly may comprise the optical apparatus of any aspect, example or embodiment described herein and at least one of a first device and a second device, the first and second devices being configured to communicate an optical signal therebetween.

The first and second devices may comprise at least one photonic component, and optionally wherein the at least one photonic component may comprise at least one of: a detector; laser; semiconductor device.

According to an aspect, there is provided a method of manufacturing an optical apparatus for routing an optical signal. The method may comprise providing a body comprising a material. The method may comprise forming a waveguide in the body by laser modification of the material. The method may comprise modifying the material to form a region comprising a lower refractive index than the material of the body. The region may define an interface between the region and the waveguide. The waveguide and the interface may be aligned relative to each other for routing the optical signal therebetween and reflecting the optical signal at the interface.

The method may comprise forming the region by modifying the body with a laser processing system and subsequently removing the modified material by etching.

The method may comprise forming the waveguide and the region in a same laser processing step.

The method may comprise forming the region using a bladed article.

The method may comprise forming the region using a material removal system configured to perform at least one of: laser ablation; laser machining; wet etching; dry etching; ion beam milling.

The method may comprise forming a plurality of waveguides in the body by laser modification of the material.

The method may comprise forming a plurality of regions in the body. Forming the waveguide may comprise forming at least one of: a 1D, 2D, or 3D waveguide in the body.

The method may comprise processing the interface to modify at least one property thereof. Processing the interface may comprise smoothing the interface, optionally wherein smoothing may comprise at least one of: flame polishing; CO2 laser polishing; etching. Processing the interface may comprise coating the interface with a metal.

The method may comprise coupling the optical apparatus to at least one photonic component, and optionally wherein the at least one photonic component may comprise at least one of: a detector; laser; semiconductor device.

According to an aspect there is provided: an optical apparatus for routing an optical signal, the optical apparatus comprising:
  a body;
  a waveguide provided in the body and configured to guide the optical signal; and
  a reflective surface provided within a cavity of the body. The reflective surface may be configured to route the optical signal between the waveguide and the cavity via an interface between the body and the cavity. The waveguide and the interface may be aligned relative to each other for allowing the optical signal to be transmitted through the interface.

The reflective surface may be configured to reflect the optical signal such that the reflection occurs within the cavity (e.g., instead of within the body). Reflection of the optical signal at the reflective surface may allow the optical signal to be routed between the waveguide and a device such as a photonic component that is operative to send and/or receive the optical signal via the cavity. In other similar words, the reflective surface may act to guide the optical signal through the cavity, and optionally via an opening to the cavity, to provide optical communication between the device and the waveguide via the interface. The reflection of the optical signal may be independent of any medium such as an adhesive present in the region, for example, such that the optical signal may undergo external reflection at the reflective surface.

The presence of such an adhesive or any other material involved in the manufacture of the optical apparatus may cause a change in the reflection characteristics at the interface since the adhesive may have a higher refractive index than a medium such as air. The presence of the adhesive in the region of the optical apparatus may not significantly affect the reflective characteristics of the reflective surface, which may rely on external reflection (e.g. due to a metal coating, or the like). Making use of external reflection for providing the routing of the optical signal may reduce manufacturing time, complexity and/or costs associated with the construction of the optical apparatus in combination with a device such as a photonic component and/or may provide additional space for other components within the body of the optical apparatus.

The reflective surface may be configured to route the optical signal by reflecting the optical signal within the cavity.

The reflective surface may be configured to guide the optical signal between the waveguide and an opening to the cavity. The opening to the cavity may be formed in a surface of the body.

The reflective surface may be configured to change a direction of propagation of the optical signal within the cavity to provide communication of the optical signal between the waveguide and a first device operative to send and/or receive the optical signal, for example, via an opening to the cavity. The optical apparatus may further comprise the first device operative to send and/or receive the optical signal.

The optical apparatus may comprise at least one of the first device and a second device. The first and second devices may be configured to communicate the optical signal therebetween. The second device may be coupled to the waveguide for sending and/or receiving the optical signal via the waveguide. The reflective surface may act to guide the optical signal between the first device and the second device. At least one of the first device and the second device may comprise a photonic component.

The first device may be at least partially located within the cavity such that the optical signal sent and/or received by the first device may propagate through the cavity (e.g., between the first device and the interface via the reflective surface). The first device may be located outside the cavity such that the optical signal sent and/or received by the first device may propagate through the cavity (e.g. between the first device and the interface via the reflective surface, and via the opening to the cavity).

The reflective surface may be provided on a surface or side of the cavity. The reflective surface may be on, or at least partially comprise, an opposite side of the cavity to the interface.

The first device may be coupled to the optical apparatus by an adhesive provided between the body and the first device. A surface of the body comprising an opening to the cavity may receive the adhesive to couple the optical apparatus to the first device.

The cavity may be at least partially filled with an adhesive.

The waveguide may be formed by laser inscription.

The cavity may be formed by laser modification of a portion of the body and subsequent removal of the laser-modified portion (e.g., by selective etching or the like). Laser modification may be capable of providing an arbitrarily-shaped cavity. For example, the resulting surface of the cavity (after removal of the laser-modified portion) may comprise any shape such as a curved portion or the like.

The resulting surface of the cavity may provide the reflective surface and/or may be appropriately modified to provide the reflective surface. The shape of the resulting surface may be defined to provide a desired beam manipulation of the optical signal (e.g. focusing, defocusing, collimation, beam shaping, or the like).

The reflective surface may comprise a curved portion. The curved portion may provide the functionality of a curved mirror, for example, to focus, defocus, collimate, beam shape or otherwise change a spatial property of the optical signal.

The reflective surface may comprise a reflective material provided on a surface of the cavity. The reflective material may be provided by coating (e.g., spin coating, or the like) the surface of the cavity. The reflective material may comprise metal such as gold, silver, or the like.

The cavity may be shaped such that a portion of the body provides a barrier for preventing a material of the reflective surface contacting the interface during manufacture of the reflective surface.

The cavity may be shaped such that a side of the cavity comprising the interface is at an angle to a surface of the body comprising an opening to the cavity.

The angle of the side of the cavity may provide a barrier at the level of the surface that prevents the interface beneath the barrier from being directly coated by a material of the reflective surface when the reflective surface is being formed.

The cavity may be shaped such that the interface or a plane parallel to the interface intersects, at the angle, the surface of the body comprising the opening to the cavity. The cavity may be shaped such that the side or a plane parallel to the side intersects, at the angle, the surface of the body comprising the opening to the cavity. The angle of intersection between the side and the surface may be substantially the same as, or different to, the angle defined between the interface and the surface. For example, the interface and the side comprising the interface may located within the same plane if the angle is substantially the same, or the interface and the part of the side not comprising the interface may not be located with the same plane if the angle is different.

The angle may be less than 90 degrees. For example, the angle may be less than at least one of: 85, 80, 75, 65, 60, 55, 50, 45, 40, 35, 30 degrees.

The portion of the body may define an overhang proximal to a surface of the body such that at least part of the interface is located within the cavity under the overhang.

According to an aspect there is provided: a method of manufacturing an optical apparatus for routing an optical signal, the method comprising:

providing a body;

providing a waveguide in the body, the waveguide being configured to guide the optical signal; and providing a reflective surface within a cavity of the body. The reflective surface may be configured to route the optical signal between the waveguide and the cavity via an interface between the body and the cavity. The waveguide and the interface may be aligned relative to each other for allowing the optical signal to be transmitted through the interface.

According to an aspect there is provided: a method of data communication comprising using the optical apparatus of any aspect or embodiment described herein, or using the optical apparatus manufactured according to any aspect or embodiment described herein, to transmit a data-carrying optical signal between a first device and a second device.

The method may comprise transmitting the data-carrying optical signal via a waveguide provided in the optical apparatus. The second device may be operative to send and/or receive the optical signal via the waveguide.

The method may comprise routing the optical signal between waveguide and the first device by at least one of: reflection at a reflective surface within a cavity of a body of the optical apparatus; and reflection at an interface between a body of the optical apparatus and a region of the body.

At least one feature of the optical apparatus and/or method may replace any corresponding feature of any other optical apparatus and/or method described herein. At least one feature of the optical apparatus and/or method may be combined with any other optical apparatus and/or method. Any reference to any feature of any optical apparatus and/or method described herein may be provided in relation to any other optical apparatus and/or method described herein. Any feature of any method described herein may be provided as part of, replace or be combined with any optical apparatus described herein, and/or any feature of any apparatus described herein may be provided as part of, replace or be combined with any method described herein.

BRIEF DESCRIPTION OF THE DRAWINGS

A description is now provided, by way of example only, with reference to the accompanying drawings, in which.

DETAILED DESCRIPTION OF THE DRAWINGS

Figure 1:
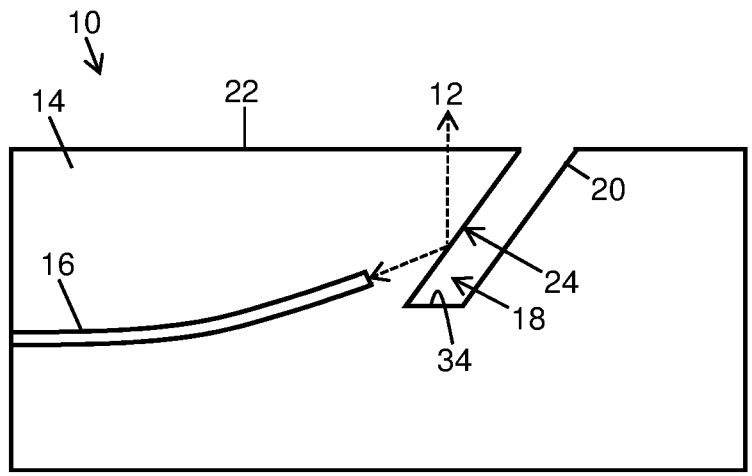
FIG. 1 is a cross-sectional view of an optical apparatus according to an embodiment.

FIG. 1 illustrates an optical apparatus 10 for routing an optical signal 12, which may be in the form of an optical beam. The optical apparatus 10 includes a body 14 comprising glass, although any other appropriate material may be used. A waveguide 16 is formed in the body 14 by laser modification of the glass. The waveguide 16 can be formed by using, for example, an ultrafast laser to inscribe a pattern in the glass so form any desired waveguide structure (e.g. a 1D, 2D or 3D waveguide structure). The waveguide 16 could be provided in any appropriate form, for example, a single-mode waveguide, multi-mode waveguide, or the like.

In addition, a region 18 is formed in the body 14 that has a lower refractive index than the body 14. In this embodiment, the region 18 is filled with gas/air, which has a lower refractive index than glass. The region 18 is in the form of a tube-shaped cavity 20 extending partially through the body 14, at an acute angle, from a surface 22 of the body 14 to a base 34 (e.g. the part of the region 18 furthest from the surface 22) of the region 18. However, it will be appreciated that the region 18 could take any form, for example, a cavity such as an aperture, hole, trench, or the like.

The region 18 is formed by using a laser, for example an ultrafast laser, to modify the glass (i.e. to change its structural properties relative to the bulk glass) and subsequently etched to remove the modified glass. The modified glass is less resistant to etching and so etches at a higher rate than the bulk unmodified glass to create the region 18. By using the laser to define any desired shape of the region 18 to be etched, the region 18 may be of any desired shape depending on requirements.

The region 18 defines an interface 24 between the region 18 and the waveguide 16. As noted previously, both the waveguide 16 and the region 18 can be formed in any desired way. In this embodiment, the region 18 comprises an interface 24 that is planar and at the acute angle to the surface 22. An optical signal 12 propagating through the body 14 and incident on the interface 24 may be reflected (e.g. via total internal reflection) at the interface 24. The waveguide 16 and the interface 24 may be formed in such a manner that their relative alignment allows the optical signal 12 to be routed between the interface 24 and the waveguide 16. In this embodiment, at least a portion of the waveguide 16 proximate to the interface 24 (in this case the output/input of the waveguide 16 is nearest to the interface 24, and hence, proximate thereto) is non-parallel to the surface 22. In an embodiment, the output/input of the waveguide 16 nearest to the interface may comprise a beam shaping element configured to control the output/input of the optical signal 12 from/into the waveguide 16. The beam shaping element may comprise a tapered element, a periodic segmented waveguide or any other beam shaping element for controlling the optical signal 12. The beam shaping element may increase or decrease the beam divergence of the optical signal 12 (e.g. the beam outputted from or coupled into the waveguide 16) or otherwise control the manner in which the optical signal 12 is outputted from or coupled into the waveguide 16.

Depending on requirements, the optical signal 12 may either or both: (i) enter the body 14 via the surface 22, propagate through part of the body 14 and be reflected at the interface 24 towards the waveguide 16 for propagation therethrough; or (ii) enter the body 14 via the waveguide 16, propagate through part of the body 14 and be reflected at the interface 24 towards the surface 22 for exiting the body 14 therethrough. Thus, the optical signal 12 may propagate in either or both directions through the optical apparatus 10, as illustrated by the dashed line arrows in FIG. 1.

Figure 2:
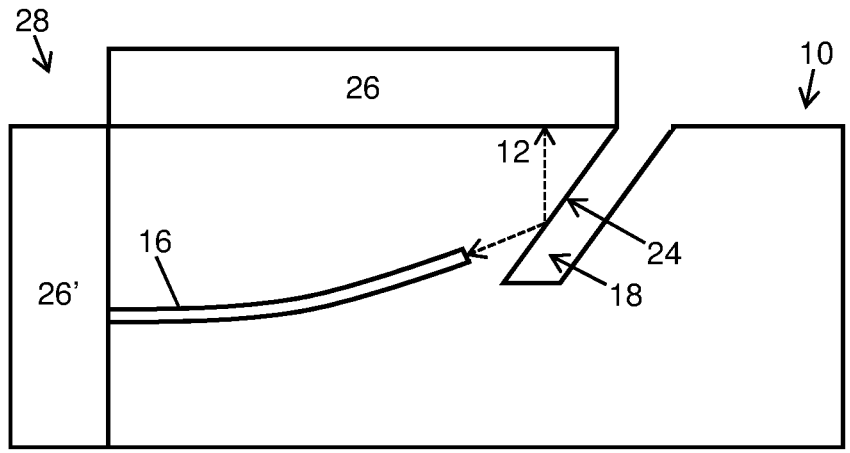
FIG. 2 is a cross-sectional view of an optical assembly comprising the optical apparatus of FIG. 1.

As illustrated by FIG. 2, the optical apparatus 10 may enable a photonic component (e.g. a laser, semiconductor device, or the like) 26' to be coupled to another photonic component 26 (e.g. a detector, semiconductor device, or the like) and provide optical communication therebetween via the optical signal 12 path defined by the waveguide 16 and interface 24. The photonic component 26 is an example of a first device and the photonic component 26' is an example of a second device. The optical apparatus 10 may couple the photonic components 26, 26' together to form an optical assembly 28, which may be relatively compact due to the ability to form any desired optical signal 12 path in the body 14. The optical apparatus 10 may be configured to provide direct optical coupling between the photonic components 26, 26'. Such an arrangement may minimise the length of the optical signal 12 path between the photonic components 26, 26', which may allow the optical assembly 28 to have a relatively small footprint.

Alternatively or in addition, the optical apparatus 10 may at least one of: provide straightforward alignment between photonic components 26, 26'; be relatively straightforward and/or cost effective to manufacture; provide flexible design options for routing or manipulating optical signals 12; allow integration and/or coupling with other photonic components 26; reduce the number of components (for example, optical fibers, lenses, or the like) required to integrate and/or couple with other photonic components 26, 26'; reduce optical losses; provide space for further optical devices; and the like.

Figure 3:
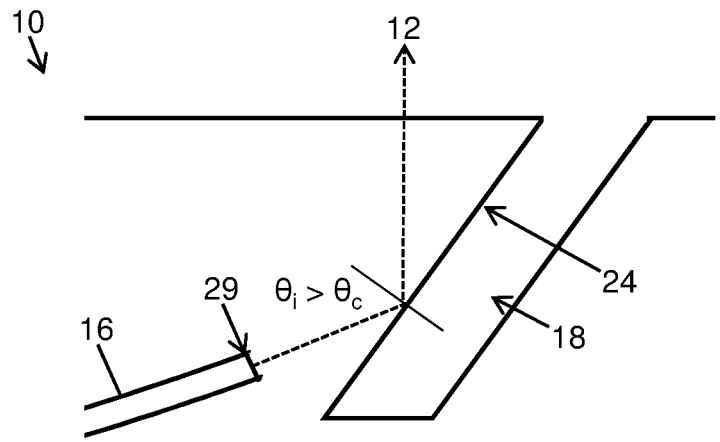
FIG. 3 is an expanded cross-sectional view of the optical apparatus of FIG. 1.

FIG. 3 depicts an expanded view of part of the optical apparatus 10 of FIG. 1. The waveguide 16 and the interface 24 have been formed in the body 14 so that an optical signal 12 transmitted from an output 29 of the waveguide 16 is directed towards the interface 24 at an incident angle θ, that is greater than the critical angle θ, defined by the ratio between the refractive indices of the glass and the air in the region 18. In such a configuration, the optical signal 12 is totally internally reflected. Where a large turning angle (e.g. 90 degrees or other large turning angles) is required, total internal reflection of the optical signal 12 may result in a lower optical loss upon reflection compared to, for example, a waveguide incorporating a bend that changes the direction of the optical signal 12 by 90 degrees (e.g. due to bending losses, or the like). It will be appreciated that if the optical signal 12 propagates in the opposite direction to that depicted by FIG. 3, the output 29 may define an input of the waveguide 16.

Figure 4:
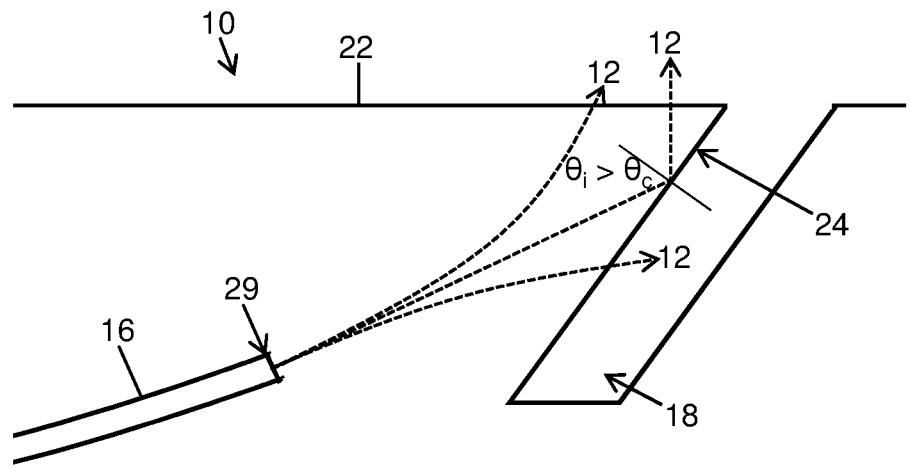
FIG. 4 is an expanded cross-sectional view of an optical apparatus according to a further embodiment.

FIG. 4 illustrates another optical apparatus 10 according to an embodiment in which the output 29 of the waveguide 16 is further away from the interface 24 than in the embodiment of FIG. 3. Three dashed lines indicate different possible beam paths for the optical signal 12 (each indicated beam path forming part of the same divergent optical beam).

The optical signal 12 is divergent such that some parts of the optical signal 12 are incident on the interface 24 above, at or below the critical angle. One divergent portion of the optical signal 12 is not incident on the interface 24 and exits through the surface 22. Another divergent portion of the optical signal 12 is incident on the interface 24 below the critical angle to substantially propagate into the region 18. Therefore, divergent parts of the optical signal 24 may suffer power losses or may not be incident on the interface 24. Therefore, divergence of any optical signal 24 transmitted from the output 29 of the waveguide 16 may be a factor in designing the relative separation between the waveguide 16 and the interface 24. There may be a range of angles incident on the interface 24 if the optical signal 24 is divergent or convergent when incident on the interface 24. Depending on the critical angle for the interface 24, some of the optical signal 24 may not be reflected (e.g. by total internal reflection) from the interface 24. When designing the optical apparatus 10, it may be necessary to take into account at least one of: the separation between waveguide 16 and the interface 24; the critical angle; divergence/convergence of the optical signal 24; and the relative angle between the waveguide 14 and the interface 24.

Figure 5:
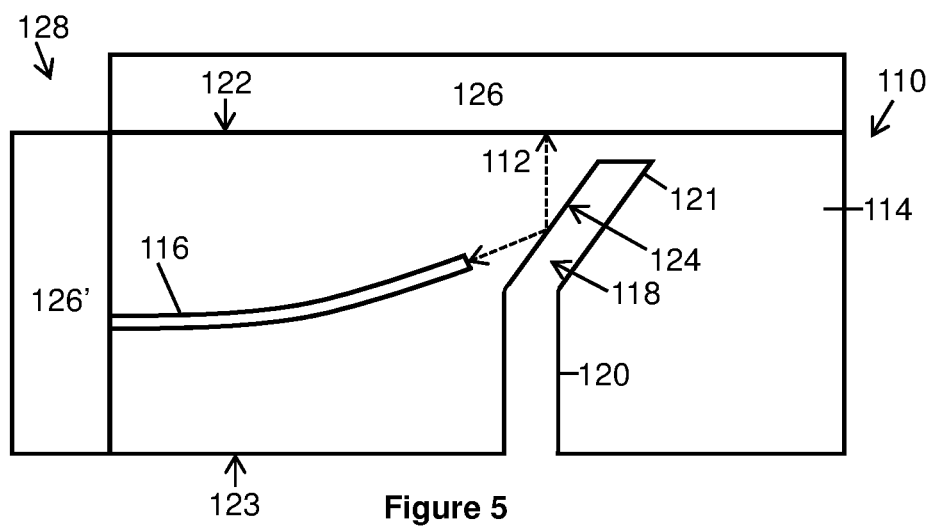
FIG. 5 is a cross-sectional view of an optical assembly comprising an optical apparatus according to another embodiment.

FIG. 5 illustrates another optical apparatus 110 according to an embodiment with similar functionality to the apparatus 10. Reference signs for the same or similar features are incremented by 100 compared with the optical apparatus 10 of FIGS. 1 to 4. Further features are described below.

Instead of the region 18 extending from the surface 22 (which is coupled to a photonic component 26) in FIG. 2, in this embodiment, a region 118 extends from another surface (in this embodiment, a non-contact surface 123 opposite to the surface 22) of the body 114 to an appropriate location in the body 114. The region 118 comprises a tube section 120 extending perpendicularly from the non-contact surface 123 partially through the body 114, and then a further tube section 121 extending through the body 114 at an acute angle from the tube section 120. The further tube section 121 (at the acute angle) comprises an interface 124 for reflecting/routing an optical signal 112 to/from a waveguide 116 in the same manner as described in relation to the apparatus 10. In this embodiment, at least a portion of the waveguide 116 proximate to the interface 124 (in this case the output/input of the waveguide 16 is nearest to the interface 124, and hence, proximate thereto) is non-parallel to the surfaces 122 and 123. A photonic device 126' (an example of a second device) is coupled to the waveguide 116 for sending and/or receiving the optical signal 112 via the waveguide 116.

Figure 6:
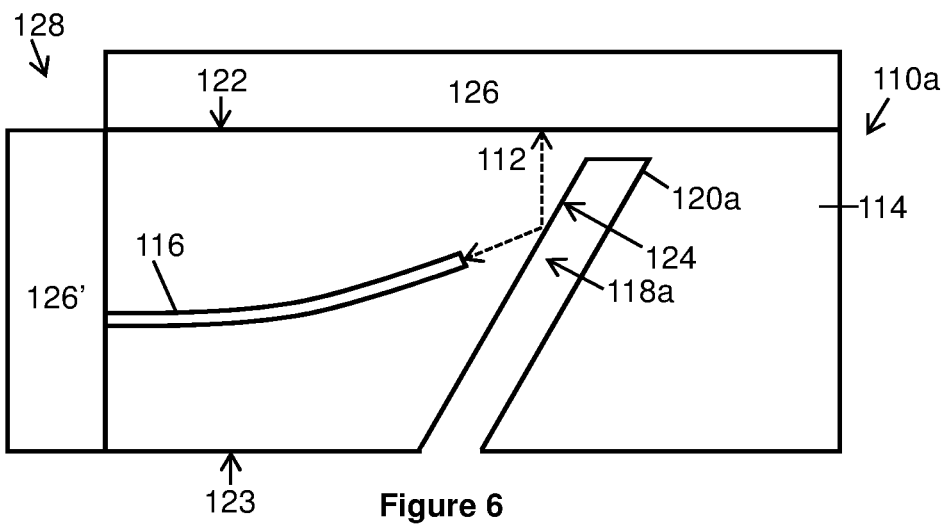
FIG. 6 is a cross-sectional view of an optical assembly comprising an optical apparatus according to a further embodiment.

It will be appreciated that the region 118 could take any form, for example, an aperture, hole, trench, or the like and may or may not comprise different sections 120, 121 extending at different angles as depicted by FIG. 5. For example, FIG. 6 illustrates another optical apparatus 110a according to an embodiment which is similar to the apparatus 110 of FIG. 5 (with the same reference numerals except for components which differ from FIG. 5). In contrast to FIG. 5, the optical apparatus 110a includes a region 118a that only has one tube section 120a (i.e. unlike FIG. 5, the region 118a does not have two tube sections). The region 118a extends at an acute angle from the surface 123, similar to the embodiments of FIGS. 1 to 4 where the region 18 extends at an acute angle from the surface 22 (albeit surface 123 is a non-contact surface). The region 18, 118, 118a may be regarded as providing a mirror (i.e. by virtue of the interface 24) and an access channel, for example, to permit a process such as coating or polishing to be carried out on a surface (e.g. an internal surface, or the like) of the region 18, 118, 118a. It will be appreciated that the opposing surfaces of the region 18, 118, 118a need not necessarily be parallel to each other as depicted by FIGS. 1 to 6. Rather, any appropriate relationship may be provided between the surfaces of the region 18, 118, 118a, for example, as depicted by FIGS. 7 to 11 and as described herein.

Providing the region 118, 118a that extends from the non-contact surface 123 may allow a photonic component 126 (an example of a first device) to be bonded to or positioned in proximity to the surface 122 without any adhesive or other substances (e.g. solvents, or the like) involved in the assembly of the optical assembly 128 entering the region 118. Unless designed to accommodate such material, any material (e.g. gas, liquid or solid) that enters the region 18, 118, 118a may adversely affect the interface 24, 124 to change the reflection characteristics of the interface 24, 124. In certain cases, the material may reduce the refractive index ratio between the body 14, 114 and the region 18, 118, 118a to such an extent that the critical angle increases (which may cause improper, or less efficient, routing of the optical signal 12, 112 through the optical apparatus 10, 110). It will be appreciated that the reference to surface 123 being a non-contact surface 123 does not necessarily mean that surface 22, 122 is a contact surface configurable to allow photonic components to be bonded or positioned in proximity thereto. The provision of the region 118, 118a extending from the so-called non-contact surface 123 instead of from the surface 122 may reduce constraints of the particular configuration of the optical apparatus 110, 110a, for example, if the photonic component(s) 126, 126' forming part of the assembly 128 may otherwise be adversely affected, or difficult to bond or position in proximity to the surface 22, 122.

Figure 7:
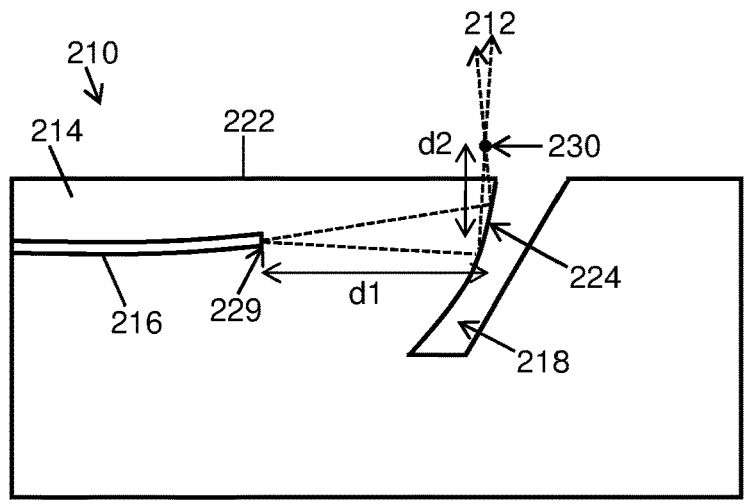
FIG. 7 is a cross-sectional view of an optical apparatus according to a further embodiment.

FIG. 7 illustrates another optical apparatus 210 according to an embodiment with similar functionality to the apparatus 10. Reference signs for the same or similar features are incremented by 200 compared with the optical apparatus 10 of FIGS. 1 to 4. Further features are described below.

The apparatus 210 comprises a region 218 shaped such that an interface 224 is non-planar. In this embodiment, the interface 224 is shaped (concave in this embodiment) such that an optical signal 212 incident on the interface 224 from a waveguide 216 is reflected (and focused) to a focal point 230 located externally of the body 214, above a surface 222 of the body 214. As illustrated by FIG. 7, an output 229 of the waveguide 216 is spaced from the interface 224 by a distance d1 such that the focal point 230 of the optical signal 212 is spaced by a distance d2 from the interface 224. In this embodiment, distance d2 is less than d1. Such a configuration may enhance optical coupling to divergent components such as VCSELs, grating couplers, and the like. By providing a pre-defined optical arrangement between the waveguide 216, interface 224, and surface 222, it may be possible to tailor the optical apparatus 210 for optimum coupling for optical signal outputs or inputs of the optical apparatus 210 (e.g. to control convergence, divergence, beam waist size, focal spot size, or the like of the optical signal 212). For example, a photonic component comprising a divergent optical signal source such as a VCSEL could be optically coupled to the surface 222 such that the output optical signal is optimally aligned (and convergent) for coupling the optical signal 212 into the waveguide 229 (the output 229 may define an optical input in this embodiment). It will be appreciated that the optical apparatus 210 may be configured such that the optical signal 212 can propagate in either or both directions through the waveguide 216, depending on the particular configuration of photonic components coupled to the optical apparatus 210.

Figure 8:
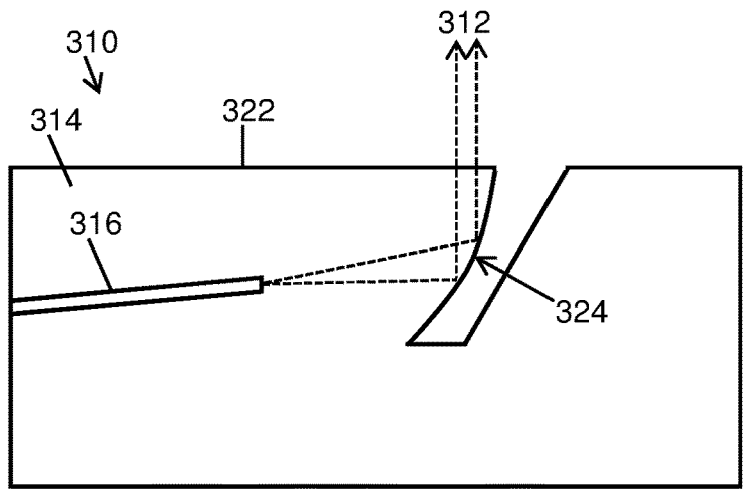
FIG. 8 is a cross-sectional view of an optical apparatus according to another embodiment.

FIG. 8 illustrates another optical apparatus 310 according to an embodiment with similar functionality to the apparatus 210, for example, to enable optical coupling between photonic components with divergent, collimated or convergent optical signal beam characteristics. Reference signs for the same or similar features are incremented by 100 compared with the optical apparatus 210 of FIG. 7. Further features are described below.

In contrast to FIG. 7, the waveguide 316 and interface 324 of FIG. 8 are configured such that an optical signal 312 is collimated upon reflection from the interface 324 towards the surface 322 (or if propagating in the opposite direction, made convergent upon being reflected towards the waveguide 316). It will be appreciated that the optical apparatus 310 may be configured such that the optical signal 312 can propagate in either or both directions through the waveguide 316, depending on the particular configuration of photonic components coupled to the optical apparatus 310.

Figure 9:
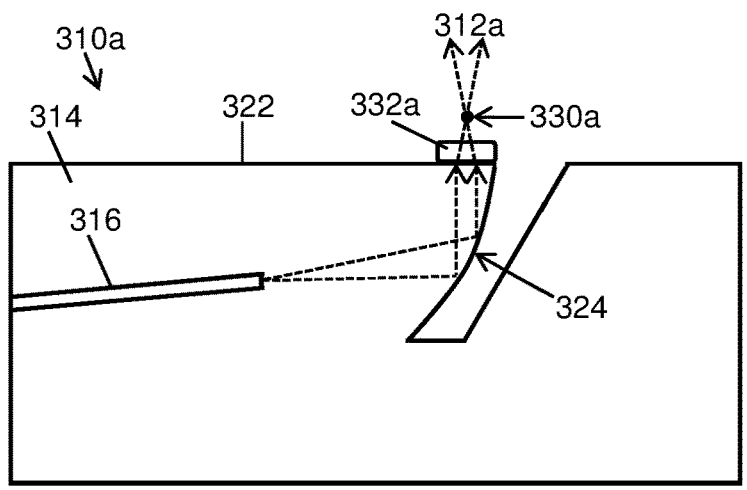
FIG. 9 is a cross-sectional view of an optical apparatus according to a further embodiment.

FIG. 9 illustrates another optical apparatus 310a according to an embodiment, which is similar to the optical apparatus 310 of FIG. 8 in that the interface 324 can be used to collimate an optical signal 312 (although it will be appreciated that the interface 324 may or may not collimate the optical signal 312). The same reference numerals are used where appropriate. Different/additional features are differentiated by reference numerals including the letter 'a'. The optical apparatus 310a includes an optical component positioned on the body 314 (i.e. on the surface 322) for manipulating the optical signal 312a. The optical component in this embodiment comprises a beam shaping device in the form of a lens 332a for focusing the optical signal 312 at focal point 330a just above the surface 322. The optical apparatus 310a may provide similar functionality to the optical apparatus 210 of FIG. 7. The lens 332a may be a freespace optical component or may be provided as part of the body 314. It will be appreciated that the lens 332a may alternatively be positioned in the body 314 (e.g. embedded therein, or the like) or otherwise provided in or on the body 314. It will further be appreciated that other optical components may be provided (in addition or alternatively to the lens 332a) to perform different functions (e.g. filtering, or the like). The optical component(s) may be defined as freespace optical component(s) or may be provided as part of or integrated with the body 314.

Figure 10:
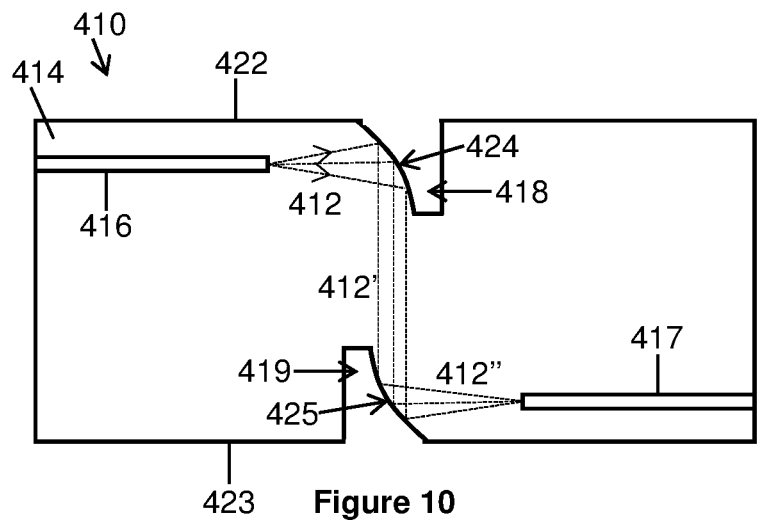
FIG. 10 is a cross-sectional view of an optical apparatus according to another embodiment.

FIG. 10 illustrates another optical apparatus 410 according to an embodiment with similar functionality to the apparatus 310, for example, to enable optical coupling between photonic components with divergent, collimated or convergent optical signal beam characteristics. Reference signs for the same or similar features are incremented by 100 compared with the optical apparatus 310 of FIG. 8. Further features are described below.

In FIG. 10, the optical apparatus 410 comprises a body 414 comprising two laterally displaced and transversely spaced-apart waveguides 416, 417 that are optically coupled via two regions 418, 419 configured to direct an optical signal 412 between the two waveguides 416, 417. The region 418 extends partially through the body 414 from a first surface 422 of the body 414. The region 419 extends partially through the body 414 from a second surface 423 of the body 414. The first and second surfaces 422 are opposite surfaces of the body 414. The regions 418, 419 are opposite to, and facing, each other. Each region 418, 419 comprises an interface 424, 425 comprising a concave surface operable to change the divergence characteristics of the optical signal 412 upon reflection from the interface 424. The interfaces 424, 425 face each other such that the optical signal 412 can propagate therebetween. In the present embodiment, the waveguide 416 transmits a divergent optical signal 412 towards the interface 424, which changes the optical signal 412 to form a collimated optical beam 412' that propagates, perpendicularly to the general propagation direction of the optical signal 412, towards the interface 425 of the other region 419. The interface 425, which in this embodiment is identical in shape to the interface 424, changes the collimated optical signal 412' to form a convergent optical signal 412" that propagates in a generally perpendicular direction to the collimated optical signal 412' towards the waveguide 417 for propagation therethrough.

The optical apparatus 410 may provide a lateral transition (e.g. vertical, horizontal, or the like) of the optical signal 412, which may avoid the need to provide a sharp bend in a single waveguide, which may otherwise induce bending losses. In addition or alternatively, it may be impossible or there may be limited space for providing optical features in the optical apparatus 410. Providing the two regions 418, 419 may provide space for other optical features or optical devices to be provided in the body 414, or at least provide flexibility in terms of the design of the optical layout within the optical apparatus 410. It will be appreciated that the optical apparatus 410 may be configured such that the optical signal 412 can propagate in either or both directions through the waveguides 416, 417, depending on the particular type or configuration of photonic components coupled to the optical apparatus 410.

Figure 11:
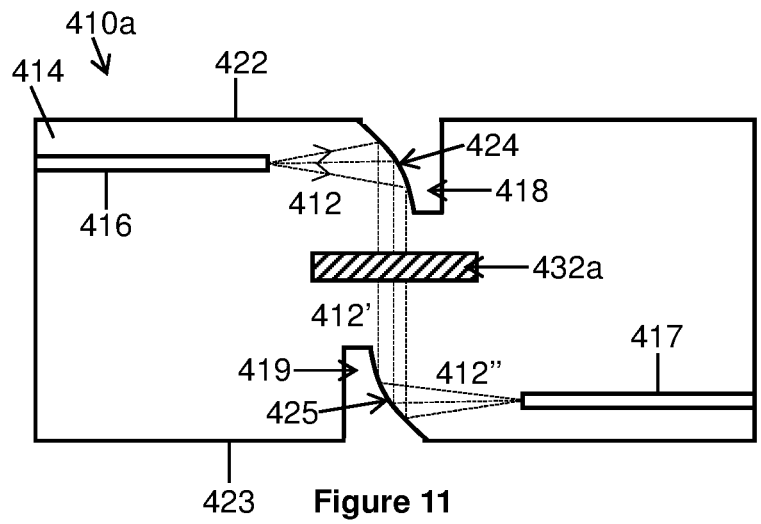
FIG. 11 is a cross-sectional view of an optical apparatus according to a further embodiment.

FIG. 11 illustrates another optical apparatus 410a according to an embodiment, which is similar to the optical apparatus 410 of FIG. 10. The same reference numerals are used where appropriate. Different/additional features are differentiated by reference numerals including the letter 'a'. The optical apparatus 410a includes an optical component positioned in the body 414 for manipulating the optical signal 412a. The optical component in this embodiment comprises a filter 432a (for example, a thin film filter, or the like, to optically filter the optical signal 412). The filter 432a may be positioned in the body 414 after a space has been formed in the body 414 to receive the filter 432a therein. The space may be formed in the same or a similar manner as the way in which the regions 418 have been formed, as described herein. It will be appreciated that the filter 432a may alternatively be positioned on the body 314 (e.g. provided at an input/output of at least one of the waveguides 416, 417) or otherwise provided in or on the body 414. It will be appreciated that the filter 432a may be fixed in place (e.g. permanently) or may be changeable to permit different filters 432a or other optical components to be positioned in the space for the filter 432a. It will further be appreciated that other optical components may be provided (in addition or alternatively to the filter 432a) to perform different functions (e.g. beam shaping, focusing, defocusing, or the like). The optical component(s) may be defined as freespace optical component(s) or may be provided as part of or integrated with the body 414.

Figure 12:
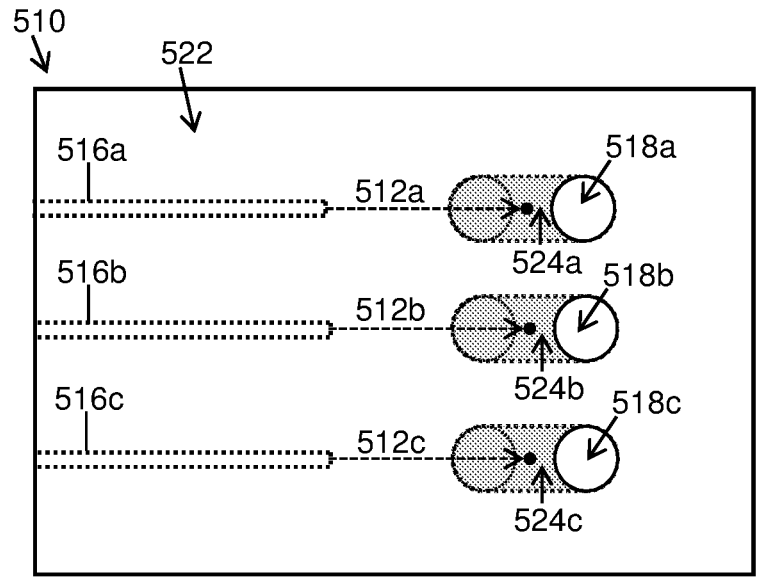
FIG. 12 is an elevated view of an optical apparatus according to another embodiment.

FIG. 12 illustrates another optical apparatus 510 according to an embodiment. Reference signs for the same or similar features are incremented by 500 compared with the optical apparatus 10 of FIG. 1. The cross-section view of FIG. 1 is identical to the cross-section view (not shown here to avoid repetition) of the optical apparatus 510. However, an elevated view of a surface 522 of the optical apparatus 510 is provided by FIG. 12, which illustrates some differences between the optical apparatus 510 and the optical apparatus 10. Further features are described below.

The optical apparatus 510 comprises a plurality of laterally spaced apart waveguides 516 (three waveguides 516a, 516b, 516c in this embodiment) and a plurality of laterally spaced apart regions 518 (three regions 518a, 518b, 518c in this embodiment). Each waveguide 516a to 516c is operable to send and/or receive respective optical signals 512a, 512b, 512c such that the optical signals 512a to 512c are each individually reflected to the surface 522 or a respective waveguide 516a to 516c by a respective interface 524a, 524b, 524c of the corresponding regions 518a to 518c. The parts of the optical apparatus 510 provided within the body 514 are represented by dotted lines. The propagation direction of the optical signals 512a to 512c are represented by dashed arrows, which point to the position on the respective interfaces 524a, 524b, 524c that reflect the respective optical signals 512a to 512c. Each position on the respective interfaces 524a, 524b, 524c includes a dot representative of where the optical signals 512a to 512c exit the surface 522. The circular solid lines associated with the regions 518a to 518c represent openings of the regions 518a to 518c on the surface 522. The optical apparatus 510 may enable a plurality of photonic components (not shown) here to be coupled to at least one other photonic component (not shown). For example, three photonic components may be operable to send and/or receive the three optical signals 512a to 512c. The optical apparatus 510 may provide flexibility in terms of routing at least one optical signal in any desired manner.

Figure 13:
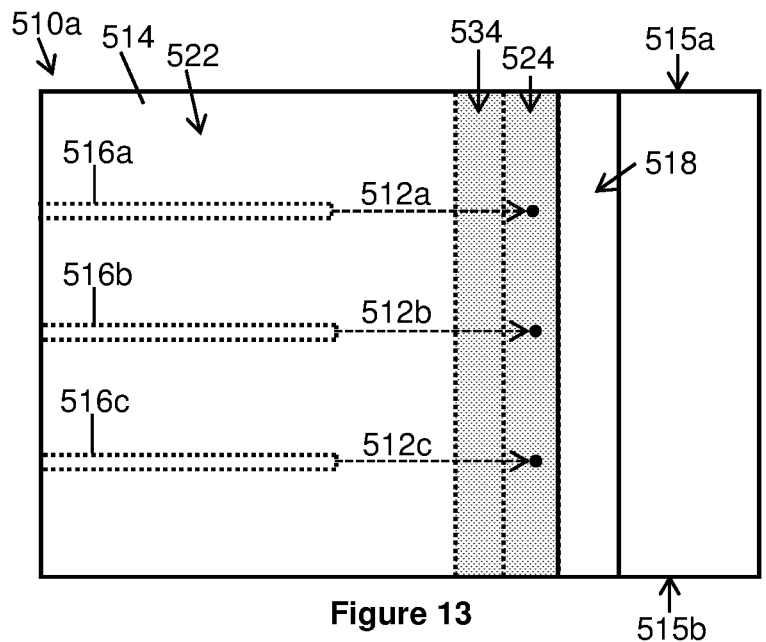
FIG. 13 is an elevated view of an optical apparatus according to a further embodiment.

FIG. 13 illustrates another optical apparatus 510a according to an embodiment, which is similar to the optical apparatus 510 of FIG. 12. The same reference numerals are used where appropriate. In contrast to the embodiment of FIG. 12, which depicts three separate regions (518a, 518b, 518c), there is only one region 518 extending from one side 515a to another side 515b of the body 514. In this embodiment, the region 518 extends transversely across the body 514 such that the region 518 between the sides 515a, 515b is perpendicular to the waveguides 516a to 516c when viewed from the elevated position of FIG. 13. The region 518 may define a slot or trench extending through the body 514 and defining a single interface 524 that is planar along its entire length. The parts of the optical apparatus 510a provided within the body 514 are represented by dotted lines (including a base 534 of the region 518 which is similar to base 34 of FIG. 1). The propagation direction of the optical signals 512a to 512c are represented by dashed arrows, which point to the position on the interface 524 that reflect the respective optical signals 512a to 512c. Each position on the respective interfaces 524a, 524b, 524c includes a dot representative of where the optical signals 512a to 512c exit the surface 522. It will be appreciated that the region 518 may take any appropriate form such that the interface 524 is a common interface for a plurality of optical signals that are reflected at the interface 524. For example, the region 518 may not be in the form of a trench extending from sides 518a to 518b. The region 518 may comprise any appropriate shape and/or extend into or through the body 514 in any appropriate way such that the interface 524 of the region 518 is a common interface for a plurality of optical signals.

Figure 14:
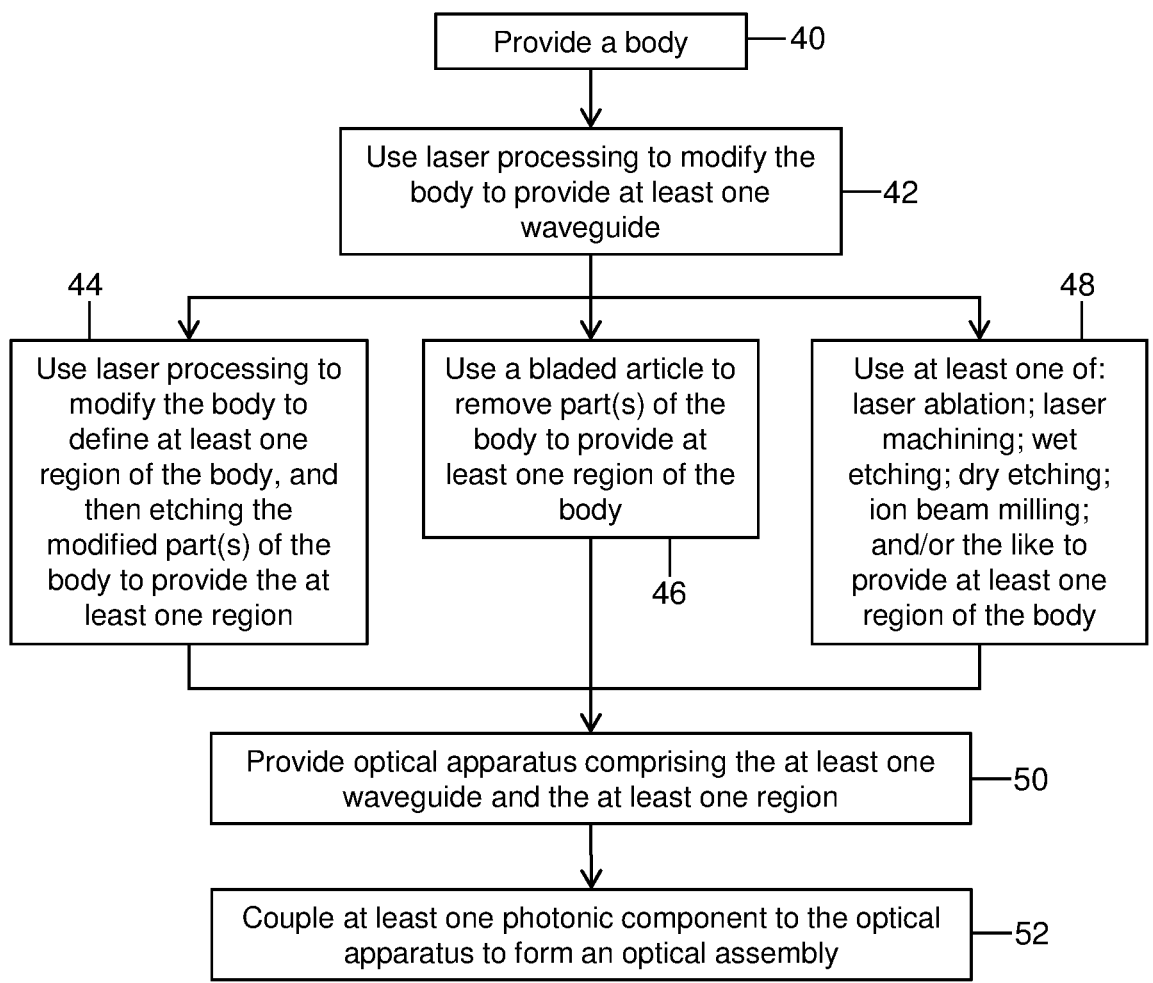
FIG. 14 depicts various steps for manufacturing an optical assembly according to an embodiment.

FIG. 14 illustrates process steps for manufacturing an optical apparatus 10 and an optical assembly 28. In a first step 40, a body 14 is provided. In a second step 42, laser processing is used to modify the body 14 to provide at least one waveguide 16. In a third step 44, laser processing is used to modify the body 14 to define at least one region 18 of the body 14. An etching substance is then provided to etch the modified part(s) of the body 14 to provide the at least one region 18 (and thereby form at least one interface 24). In addition or alternatively to the third step 44, a step 46 may comprise using a bladed article to remove part(s) of the body 14 to provide at least one region 18 of the body 14. In addition or alternatively to steps 44, 46, as part of another step 48, at least one region 18 of the body 14 may be formed using at least one of: laser ablation; laser machining; wet etching; dry etching; ion beam milling; and/or the like. Any of the steps 44, 46, 48 may be used alone or in combination to provide the at least one region 18.

In a further step 50, an optical apparatus 10 is provided that comprises the at least one waveguide 16 and the at least one region 18. In a further step 52, at least one photonic component 26, 26' is coupled (e.g. by attaching, bonding, or the like) to the optical apparatus 10 to form an optical assembly 28. It will be appreciated that these process steps may be applicable for manufacturing any optical apparatus 10, 110, 210, 310, 410, 510 described herein and/or manufacturing any associated optical assembly.

Figure 15:
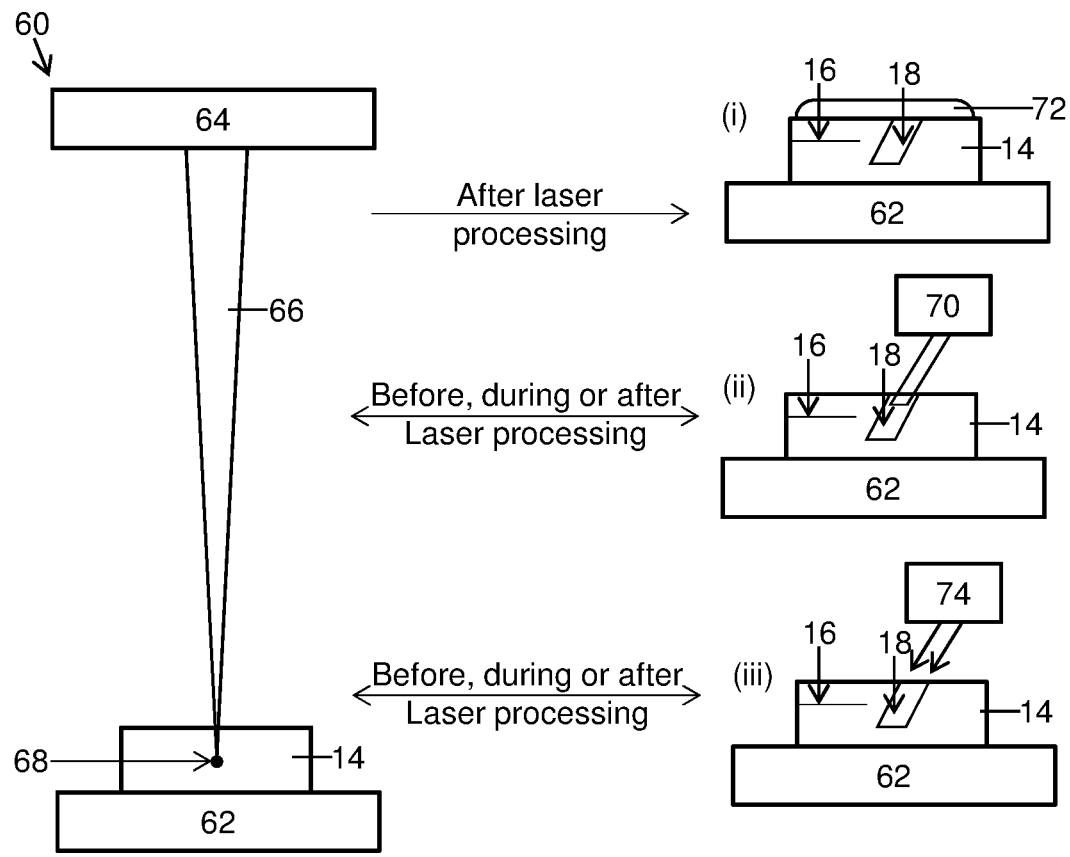
FIG. 15 schematically illustrates a tool for manufacturing an optical apparatus according to an embodiment.

FIG. 15 illustrates a tool 60 for manufacturing the optical apparatus 10 in which at least one waveguide 16 is formed by laser modification as described herein. FIG. 15 also depicts three embodiments of methods/systems (see options (i), (ii) and (iii) from top to bottom on the right hand side of FIG. 15) for forming the region 18.

The tool 60 comprises a support 62 for holding and/or moving the body 14 and a laser processing tool 64 for performing at least one laser processing step (e.g. to form at least one waveguide 16 and/or define at least one region 18). The laser processing tool 64 comprises an ultrafast and/or short pulse and/or ultrashort pulse laser (or any other appropriate laser for modifying the material of the body 14) for producing a laser beam 66 (which may or may not be moved). A focal point 68 of the laser beam 66 may structurally and/or chemically modify the body 14 (for example, as the laser beam 66 and/or the body 14 are moved relative to each other or while the laser beam 66 and/or body 14 are stationary) to form the modified part(s) of the body 14.

Examples of laser processing techniques that may be used to produce the waveguide and/or region are described in WO 2008/155548 and WO 2011/154701, the contents of which are hereby incorporated by reference.

The formation of the at least one waveguide 16 and the at least one region 18 may be performed in the same laser processing step, which may help to control or reduce any error in the alignment between the at least one waveguide 16 and the at least one region 18. Alternatively, the at least one waveguide 16 and the at least one region 18 may be formed in separate steps. In the embodiments described herein, the region 18 extends from a surface of the body 14. It will however be appreciated the region 18 may be provided in any appropriate way.

In the top right embodiment (i) of FIG. 15, the depicted system forms the region 18 after modification of the defined region 18 by the laser processing tool 64. In this embodiment, the defined region 18 may be etched using an etching substance 72 (for example, potassium hydroxide (KOH), hydrogen fluoride (HF), or the like) provided on the surface of the body 14. An example of an etching process using KOH following laser processing is described in Matsuo et al., *"Femtosecond laser-assisted etching of Pyrex glass with aqueous solution of KOH"*, Applied Surface Science 255 (2009), pp. 9758-9760, the contents of which is hereby incorporated by reference in its entirety. The laser-processed region 18 may be less resistant to etching than the bulk material of the body 14 such that only the region 18 may be etched away, or at least the unmodified material of the body 14 is etched away at a slower rate than the modified material of the region 18.

In the centre right embodiment (ii) of FIG. 15, the depicted system may form the region 18 before, during or after the waveguide 16 has been formed by laser modification. In this embodiment, the at least one region 18 may be formed using a bladed article 70 such as a drill bit, diamond drill, diamond dicing blade, knife, saw, or any other appropriate cutting device.

In the bottom right embodiment (iii) of FIG. 15, the depicted system may form the region 18 either before, during or after the waveguide 16 has been formed by laser modification. The at least one region 18 may be formed using a material removal system 74 configured to perform at least one of: laser ablation; laser machining; wet etching; dry etching; ion beam milling; and/or the like on the material of the body 14 to form the at least one region 18.

It will be appreciated that any of the systems and/or methods of the depicted embodiments (i) to (iii) may be combined and/or modified to form or provide the region 18. It will further be appreciated that the laser processing tool 64 may or may not be used to form or define the region 18. In embodiment (i) of FIG. 15, the laser processing tool 64 is used to first define the region 18 (e.g. by modifying the material in that region 18) and then etching is used to clearout the modified material in the defined region 18. In embodiments (ii) and (iii) of FIG. 15, the clearout or removal of material from the region 18 may be performed independently of the formation of the waveguide 16. It will however be appreciated that laser processing of the region 18 (e.g. using the laser processing tool 64) may be performed in combination with any of the depicted embodiments of FIG. 15. It will further be appreciated that if using the laser processing tool 64 to provide the waveguide 16 and the region 18, different laser beam parameters (e.g. pulse energy, irradiation time, optical beam focal properties, etc) may be used to modify the material of the body 14 to provide the waveguide 16 and the region 18 (each of which may have different structural and/or chemical properties).

Figure 16:
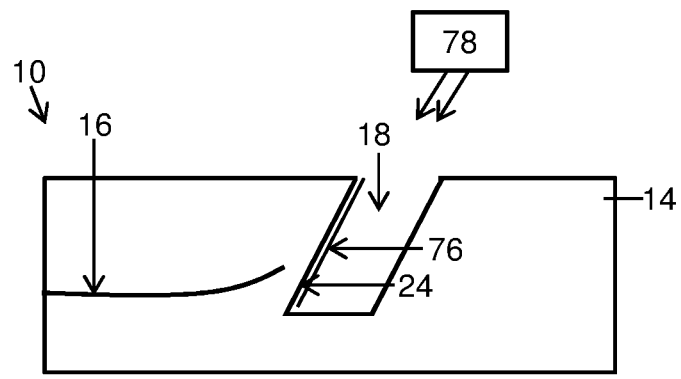
FIG. 16 is a cross-sectional view of an optical apparatus according to a further embodiment.

As illustrated by FIG. 16, the interface 24 may be processed to modify at least one property thereof. In the depicted embodiment, the interface 24 is modified by a surface processing tool 78 configured to process the interface 24. In an embodiment, the surface processing tool 78 may be configured to smooth the interface 24 by performing at least one of: flame polishing; CO2 laser polishing; etching; and/or the like. In addition or alternatively, the surface processing tool 78 may be configured to coat the interface with a metal 76, for example, to enhance the reflective properties of the interface 24.

Figure 17:
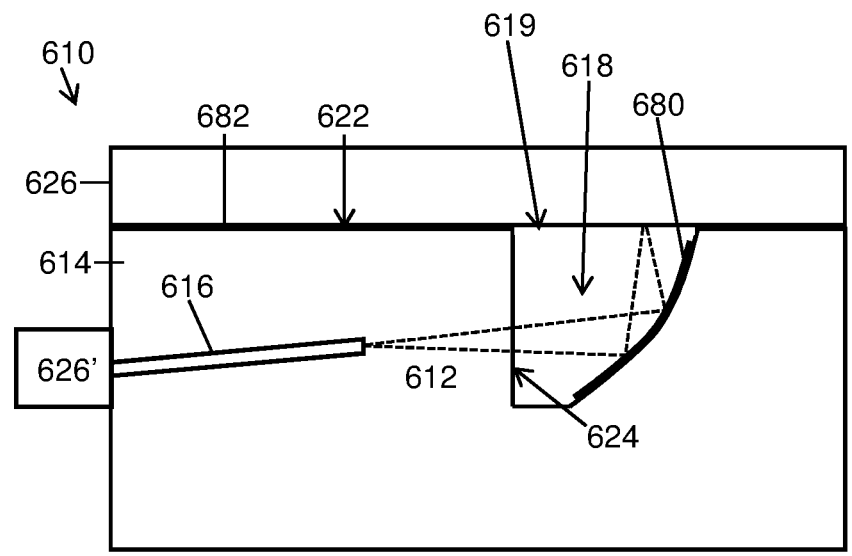
FIG. 17 is a cross-sectional view of an optical apparatus according to a further embodiment.

FIG. 17 illustrates another optical apparatus 610 according to an embodiment with similar functionality to the apparatus 210, 310 of FIGS. 7 and 8, respectively.

Reference signs for the same or similar features are incremented by 400 compared with the optical apparatus 210 of FIG. 7. Further features are described below.

The apparatus 610 comprises a reflective surface 680 located within a cavity 618 formed in a body 614 of the optical apparatus 610. An interface 624 is defined between the cavity 618 and the body 614. The body 614 comprises a laser-inscribed waveguide 616. However, in contrast to previous embodiments, the waveguide 616 and the interface 624 are positioned relative to each other such that an optical signal 612 can be transmitted through the interface 624. The reflective surface 680 is located on an opposite side of the cavity 618 to that of the interface 624 such that the reflective surface 680 faces the interface 624 through which the optical signal 612 is transmitted. In other similar words, the reflective surface 680 is configured to reflect the optical signal 612 such that the reflection occurs within the cavity 618 instead of within the body 614. Reflection of the optical signal 612 at the reflective surface 680 allows the optical signal 612 to be routed between the waveguide 616 and a first device comprising a photonic component 626 that is operative to send and/or receive the optical signal 612 via the cavity 618. A further photonic component 626' (an example of a second device) is coupled to the waveguide 616 for sending and/or receiving the optical signal 612 via the waveguide 616. The cavity 618 can be formed in a similar manner to that described previously, for example, by laser inscription and subsequent etching or any other appropriate method. The reflective surface 680 comprises a coating such as metal to provide high reflectivity. In this embodiment, a surface of the cavity 618 comprises a curved portion which, when coated to form the reflective surface 680, provides the functionality of a curved mirror similar to that described in relation to the optical apparatus 210, 310 of FIGS. 7 and 8, respectively.

Beneficially, the reflective surface 680 allows the optical signal 612 to be routed between the waveguide 616 and the photonic component 626 and may assist with the assembly of the body 614 and the photonic component 626. In this embodiment, the photonic component 626 is coupled to a surface 622 of the body 614 using an adhesive 682, said surface 622 comprising an opening 619 to the cavity 618. The adhesive 682 may also at least partially fill the cavity 618 and contact the interface 624. In embodiments such as depicted by FIGS. 1 to 4, the presence of such an adhesive or any other material involved in the manufacture of the optical apparatus 610 may cause a change in the reflection characteristics at the interface since the adhesive has a higher refractive index than a medium that normally occupies the cavity 118 such as air. The presence of the adhesive 682 in the cavity 618 of the optical apparatus 610 may not significantly affect the reflective characteristics of the reflective surface 680, which rely on external reflection (e.g. due to a metal coating, or the like) rather than total internal reflection. Accordingly, the optical apparatus 610 may facilitate routing of an optical signal 612 between the waveguide 616 and the photonic component 626, for example, by avoiding or reducing optical losses at the reflective surface 680 when adhesive 682 or other material is present in the cavity 618. In the optical apparatus 110, 110a of FIGS. 5 and 6, the problem with adhesive 682 or other material affecting the total internal reflection characteristics of the interface 124 is overcome by forming the cavity 118 via a different surface of the body 114 (i.e. on an opposite side to the surface 122) such that no adhesive enters the cavity 118 when a photonic device is coupled to the body. In the present embodiment, the optical apparatus 610 may reduce manufacturing time, complexity and/or costs by reducing the size of the cavity 618 (e.g., as compared to that of FIGS. 5 and 6) and/or may provide additional space for other components within the body 614.

Figure 18:
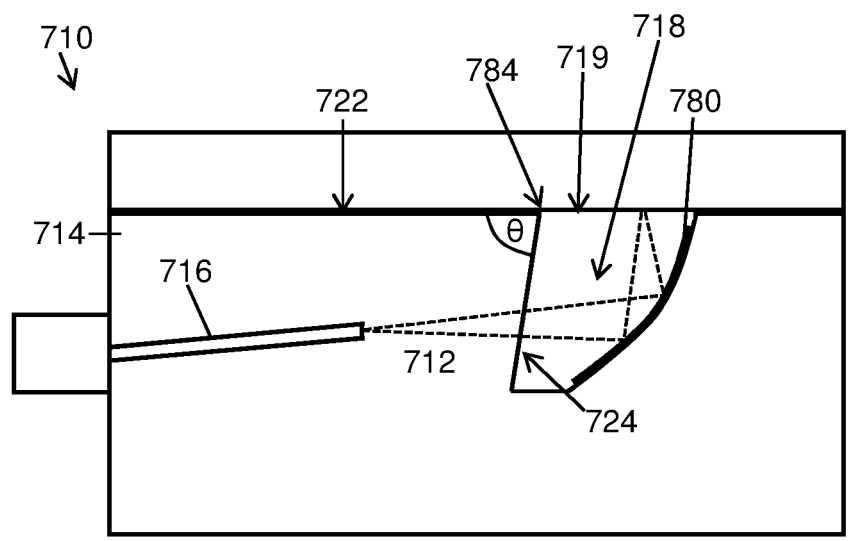
FIG. 18 is a cross-sectional view of an optical apparatus according to a further embodiment.

FIG. 18 illustrates another optical apparatus 710 according to an embodiment with similar functionality to the apparatus 610 of FIG. 17. Reference signs for the same or similar features are incremented by 100 compared with the optical apparatus 610 of FIG. 17. Not all features are labelled with reference signs for brevity. Further features are described below.

During the step of forming the reflective surface 780 within the cavity 718, there is a risk that the interface 724 may become coated with e.g., metal particles, which may affect the transmission of an optical signal 712 therethrough. Accordingly, the cavity 718 is formed in such a way to reduce the risk of the reflective coating reaching the interface 724. In this embodiment, the cavity 718 is shaped such that a portion of the body 714 provides a barrier 784 for preventing a material of the reflective surface 780 contacting the interface during manufacture of the reflective surface 780. In particular, the cavity 718 is shaped such that a side of the cavity 718 comprising the interface 724 is at an angle θ (e.g., less than 90 degrees) to the surface 722 of the body 714 comprising an opening 719 to the cavity 718. Due to the angle of the side of the cavity 718 comprising the interface 724, the portion of the body 714 providing the barrier 784 defines an overhang proximal to the surface 722 of the body 714 such that at least part of the interface 724 is located within the cavity 718 under the overhang.

Various modifications may be made to the optical apparatus and/or methods described herein. At least one feature of one of the optical apparatus may replace any corresponding feature in the methods. At least one feature of optical apparatus and/or method may be combined with any other optical apparatus and/or method.

For example, the interface and/or the reflective surface may comprise any surface or shaped portion for generating non Gaussian beam shapes such as an astigmatic beam (e.g. by providing the interface with a curved surface comprising a non-symmetrical profile). Such a configuration may be useful for providing astigmatic focusing, or the like, for providing optimal optical communication with an asymmetric waveguide, or the like. Alternatively or additionally, any other type of beam (e.g. by providing the interface with a curved surface comprising an elliptical, cylindrical, parabolic profile, or the like). The interface and/or the reflective surface may comprise an axicon-shaped surface for Bessel beam generation, or the like. The interface and/or the reflective surface may comprise a Fresnel lens-shaped surface for efficient generation of a focused beam, or the like. The interface and/or the reflective surface may comprise a phase pattern or shape, a diffractive element, or the like. Thus, the phase pattern or shape, the diffractive element, or the like may be capable of producing one or more output optical signals (e.g. after reflection/diffraction of at least one input optical signal).

Any reference to a region herein may refer to a cavity. Similarly, any reference to a cavity herein may refer to a region.

Any number of waveguides and/or regions and/or cavities may be provided in any desired configuration. The interface(s) and/or the reflective surface formed by the at least one region and/or cavity may have any particular configuration for reflecting at least one optical signal in any desired manner. The same region and/or cavity may comprise the same interface and/or reflective surface for reflecting a plurality of optical signals (e.g. from different waveguides).

A skilled person will appreciate that there will be various possibilities for providing various optical designs within an optical apparatus for providing optical communication and/or coupling for at least one photonic component. The skilled person will further appreciate that laser processing (and optionally in combination with etching or cutting) may be used to produce optical devices or structures other than waveguides and regions and/or cavities as described herein.

The invention claimed is:

1. An optical apparatus for routing an optical signal, comprising:
   a body comprising a material;
   a waveguide formed in the body by laser modification of the material; and
   a cavity formed in the body and extending partially through the body from a first surface of the body, wherein
   the cavity has a lower refractive index than the material of the body and defines an interface between the cavity and the waveguide, the waveguide and the interface being aligned relative to each other for routing the optical signal therebetween through material of the body and reflecting the optical signal at the interface,
   the body comprises a second surface, the interface being arranged so that the optical signal enters or exits the body through the first surface or the second surface, the first surface and the second surface being opposing surfaces,
   the first surface is flat,
   the cavity extends from an opening defined in the first surface to a base of the cavity, and
   the first surface of the body fully surrounds the opening of the cavity.

2. The optical apparatus of claim 1, wherein the waveguide and the interface are aligned relative to each other such that the optical signal is incident on the interface at an angle greater than a critical angle for supporting total internal reflection.

3. The optical apparatus of claim 2, wherein the interface and an output of the waveguide are separated such that in operation the optical signal leaves the waveguide output as a beam that diverges to at least some extent before arriving at the interface, and the interface is shaped and oriented relative to the waveguide such that at least one of:
   a) the beam is incident on the interface at an angle greater than the critical angle across substantially the full width of the beam;
   b) total internal reflection is obtained at the interface across substantially the full width of the beam.

4. The optical apparatus of claim 1, wherein at least one of:
   a centreline of the waveguide extends through the body in three orthogonal directions and/or the waveguide follows a curved path through the body; and
   at least a portion of the waveguide proximate to the interface is non-parallel to at least one surface of the body.

5. The optical apparatus of claim 1, wherein the interface comprises an interface between material of the body, or a layer attached to material of the body, and air or other gas or vacuum in the cavity.

6. The optical apparatus of claim 1, wherein the waveguide is positioned within the body such that the optical signal does not propagate through the lower refractive index cavity before being reflected at the interface.

7. The optical apparatus of claim 1, the waveguide and interface being configured to allow the optical signal to propagate in either or both directions along a beam path defined between the first surface or the second surface of the body and the waveguide.

8. The optical apparatus of claim 7, wherein:
   the interface is configured to reflect the optical signal between the first surface or the second surface and the waveguide; and/or the interface is oriented at an acute angle relative to the first surface of the body.

9. The optical apparatus of claim 1, wherein the interface is shaped for modifying a characteristic of the optical signal.

10. The optical apparatus of claim 9, wherein:
    the characteristic comprises at least one of: divergence, convergence, and beam shape; and/or
    the interface comprises at least one of: a concave surface; convex surface; non-planar surface; curved surface; axicon; Fresnel lens; aberration compensator; phase pattern or shape; and
    diffractive element.

11. The optical apparatus of claim 1, wherein the waveguide and the interface are configured such that at least one of:
    a characteristic of the optical signal is modified; and
    their relative positioning and alignment modifies a characteristic of the optical signal.

12. The optical apparatus of claim 1, comprising at least one other cavity forming another interface for routing the optical signal.

13. The optical apparatus of claim 12, wherein the interface and the other interface are configured to change a direction of propagation of the optical signal within the body, and wherein the interface and the other interface are configured to provide a lateral change in propagation direction of the optical signal.

14. The optical apparatus of claim 1, wherein the apparatus comprises at least one of:
    a plurality of waveguides and at least one interface, the plurality of waveguides supporting propagation of a plurality of optical signals therethrough;
    at least one optical component positioned in or on the body for manipulating the optical signal;
    at least one optical component positioned in or on the body for manipulating the optical signal, and the at least one optical component comprises a beam shaping device, optionally wherein the beam shaping device comprises a lens;
    at least one optical component positioned in or on the body for manipulating the optical signal, and the at least one optical component comprises a filter;
    a coating on a surface of the interface, optionally wherein the coating comprises a metal coating; and
    at least one photonic component coupled to the body for at least one of: transmitting the optical signal into; and receiving the optical signal from the body, and optionally wherein the at least one photonic component comprises at least one of: a detector; laser; semiconductor device.

15. An optical assembly comprising the optical apparatus of claim 1, a first device and a second device, the first and second devices being configured to communicate an optical signal therebetween using the optical apparatus.

16. A method of data communication comprising using the optical apparatus of claim 1 to transmit a data-carrying optical signal between a first device and a second device.

17. The method of claim 16, comprising transmitting the data- carrying optical signal via a waveguide provided in the optical apparatus, the second device being operative to send and/or receive the optical signal via the waveguide.

18. The method of claim 17, comprising routing the optical signal between waveguide and the first device by at least one of: reflection at a reflective surface within a cavity of a body of the optical apparatus; and reflection at an interface between a body of the optical apparatus and a region of the body.

19. The optical apparatus of claim 1, wherein the cavity is formed by at least one of:
   modifying the material with a laser processing system and subsequently removing the modified material by etching; and
   using a bladed article to remove material.

20. The optical apparatus of claim 1, wherein the interface and waveguide are configured to modify the optical signal so as to form a convergent, collimated or divergent optical signal.

21. The optical apparatus of claim 1, wherein the waveguide comprises at least one of:
   a multi-mode; and single-mode waveguide.

22. The optical apparatus of claim 1, wherein the cavity is tube shaped.

* * * * *